(12) United States Patent
Kim et al.

(10) Patent No.: US 12,103,440 B2
(45) Date of Patent: Oct. 1, 2024

(54) SEAT ADJUSTMENT APPARATUS FOR MOBILITY

(71) Applicants: Hyundai Motor Company, Seoul (KR); Kia Corporation, Seoul (KR)

(72) Inventors: Mu Young Kim, Osan-si (KR); Sang Do Park, Suwon-si (KR); Ho Suk Jung, Hwaseong-si (KR); Jun Young Yun, Osan-si (KR); Jun Hwan Lee, Seoul (KR); Chan Ho Jung, Gunpo-si (KR); Hyeok Seung Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 206 days.

(21) Appl. No.: 17/866,996

(22) Filed: Jul. 18, 2022

(65) Prior Publication Data

US 2023/0135531 A1 May 4, 2023

(30) Foreign Application Priority Data

Nov. 2, 2021 (KR) ........................ 10-2021-0148778

(51) Int. Cl.
*B60N 2/20* (2006.01)
*B60N 2/90* (2018.01)
*B60N 2/18* (2006.01)

(52) U.S. Cl.
CPC ............... *B60N 2/20* (2013.01); *B60N 2/919* (2018.02); *B60N 2/18* (2013.01); *B60N 2/1814* (2013.01); *B60N 2/1839* (2013.01); *B60N 2002/924* (2018.02)

(58) Field of Classification Search
CPC .......... B60N 2/20; B60N 2/18; B60N 2/1803; B60N 2/181; B60N 2/1814; B60N 2/1842; B60N 2/1853; B60N 2/1835; B60N 2/1839
See application file for complete search history.

(56) References Cited

U.S. PATENT DOCUMENTS 10,596,928 B2 * 3/2020 Pleskot ............... B60N 2/1853
11,453,314 B2 * 9/2022 Kim .................. B60N 2/02246

FOREIGN PATENT DOCUMENTS

JP 2009-202844 A 9/2009

\* cited by examiner

*Primary Examiner* — Syed A Islam
(74) *Attorney, Agent, or Firm* — Morgan, Lewis & Bockius LLP

(57) ABSTRACT

A seat adjustment apparatus for mobility includes a seat cushion, wherein, during seat cushion tilting, the front portion of the seat cushion is moved upwards, and the rear portion thereof is moved downwards so that the occupant's lower body is not moved upwards as a whole, and the occupant's feet are not excessively lifted. Accordingly, there is no need for a separate footrest for supporting the occupant's feet, and seating convenience is improved by implementing a stable occupant posture. Furthermore, a tilting bar provided for seat cushion tilting supports a seat frame so that the posture of the occupant's lower body does not collapse due to deformation of the seat cushion during a collision, securing the occupant's stability.

19 Claims, 7 Drawing Sheets

SEAT ADJUSTMENT APPARATUS FOR MOBILITY

CROSS-REFERENCE TO RELATED APPLICATION(S)

The present application claims priority to Korean Patent Application No. 10-2021-0148778, filed on Nov. 2, 2021, the entire contents of which is incorporated herein for all purposes by this reference.

BACKGROUND OF THE PRESENT DISCLOSURE

Field of the Present Disclosure

The present disclosure relates to a seat adjustment apparatus for mobility configured such that, when a seat cushion is tilted, the front side of the seat cushion is moved upwards, and the rear side thereof is moved downwards, implementing a stable occupant posture.

Description of Related Art

In general, a vehicle includes a driver seat and a passenger seat in the front row, and rear seats for additional occupants in the rear row, and various convenience devices are provided on the seats to improve occupant convenience.

For example, a convenience device mounted on a seat includes a seat position adjustment device for adjusting the seat position by moving the seat forwards/backwards according to the occupant's physique, a reclining device for adjusting the inclination of the seatback, a height adjustment device for adjusting the seat height, and a tilting device for configured for adjusting the tilting angle of the seat.

In line with recent development of autonomous vehicles, seat position adjustment is applied more widely. However, in the case of a conventional tilting device, the seat is tilted as a whole, and both the occupant's lower body and buttocks are moved upwards. This causes a problem in that, in a seat tilting mode, the occupant's seating height is changed, making the seating posture uncomfortable.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a seat adjustment apparatus for mobility, wherein, during seat cushion tilting, the front portion of the seat cushion is moved upwards, and the rear portion thereof is moved downwards so that the occupant's lower body is not moved upwards as a whole, and the occupant's feet are not excessively lifted; accordingly, there is no need for a separate footrest for supporting the occupant's feet; and seating convenience is improved by implementing a stable occupant posture.

In accordance with an aspect of the present disclosure, a seat adjustment apparatus for mobility includes: a set bracket to which a back frame is rotatably connected; a height link including a plurality of links and rotatably connected to a front portion of the set bracket; a tilting frame including a front pipe and a side member, the side member including a front end portion connected to the front pipe and a rear end portion rotatably connected to the back frame; a tilting bar rotatably connected to a front end portion of the side member and extending in an identical direction to the front pipe, the height link being coupled to the tilting bar; and a driving unit provided at the front pipe and connected to the tilting bar to rotate the tilting bar as a length thereof is changed in forward and backward directions during an operation thereof.

The height link may include a dive link rotatably connected to the set bracket, and a tilt link coupled to the tilting bar, and the dive link and tilt link may be rotatably connected to each other.

The dive link may be formed to be curved upward, and the tilt link may be formed to wrap around the dive link to be hinged to the dive link while wrapping around the dive link and is coupled to the tilting bar.

The side member of the tilting frame may include a front hockey bar including a front end portion to which the front pipe and the tilting bar are connected, and a rear hockey bar including a front end portion rotatably connected to the front hockey bar and a rear end portion rotatably connected to the back frame.

The set bracket may further include a support link rotatably connected to a middle portion thereof, and the support link may be rotatably connected to the front hockey bar or the rear hockey bar.

The set bracket may further include a support link rotatably connected to a middle portion thereof, and the support link may be rotatably connected to a point at which the front hockey bar and the rear hockey bar are pivotally connected to each other, sharing a rotation center point of the front hockey bar and the rear hockey bar.

The driving unit may include a driving motor provided at the front pipe of the tilting frame, and a power transmission unit rotatably connected to the tilting bar and configured to be drawn into or out of the driving motor during an operation of the driving motor.

A moving link may be coupled to the tilting bar and rotated along with the tilting bar, and the power transmission unit may be rotatably connected to the moving link.

The driving motor may be provided obliquely downwardly from the front pipe, and the power transmission unit may be drawn out of or into a rear side of the driving motor.

A seat adjustment apparatus for mobility including the above-mentioned structure is advantageous in that, during seat cushion tilting, the front portion of the seat cushion is moved upwards, and the rear portion thereof is moved downwards so that the occupant's lower body is not moved upwards as a whole, and the occupant's feet are not excessively lifted. Accordingly, there is no need for a separate footrest for supporting the occupant's feet, and seating convenience is improved by implementing a stable occupant posture.

Furthermore, a tilting bar provided for seat cushion tilting supports a seat frame so that the posture of the occupant's lower body does not collapse due to deformation of the seat cushion during a collision, securing the occupant's stability.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
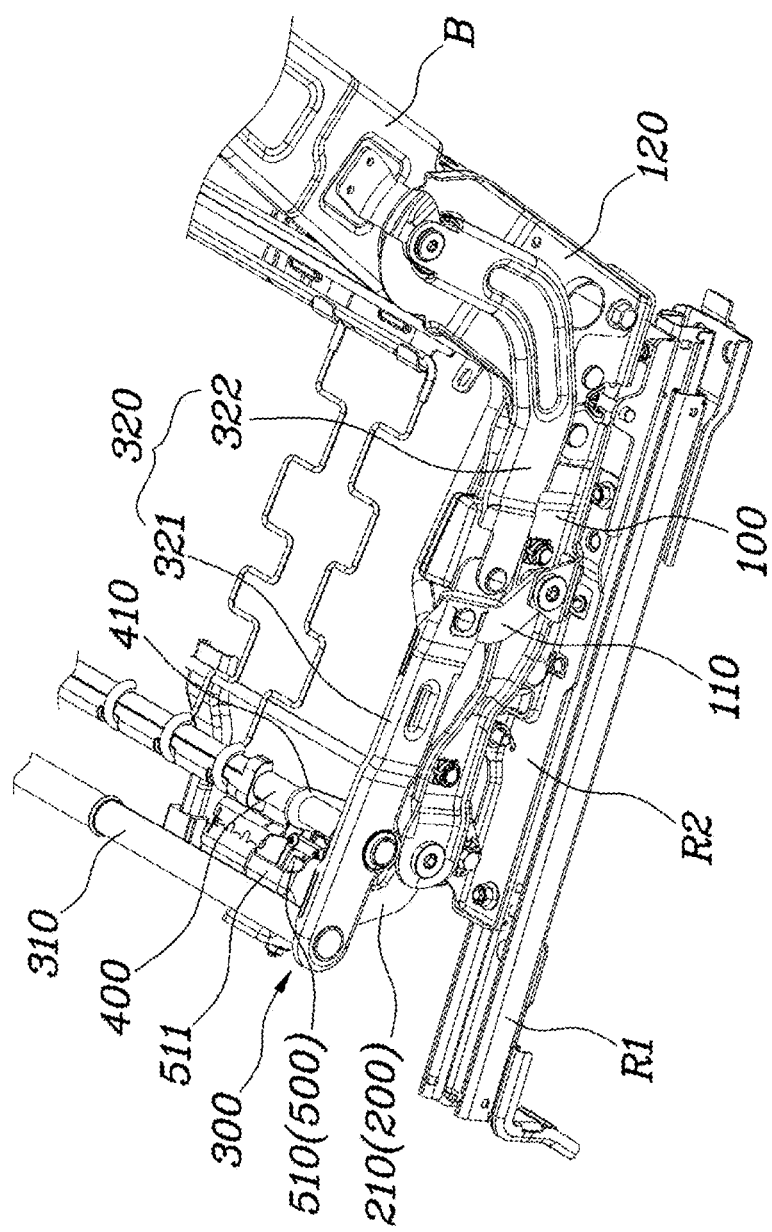
FIG. 1 illustrates a seat adjustment apparatus for mobility according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a seat adjustment apparatus for mobility according to an exemplary embodiment of the present disclosure will be described with reference to the accompanying drawings.

Figure 2:
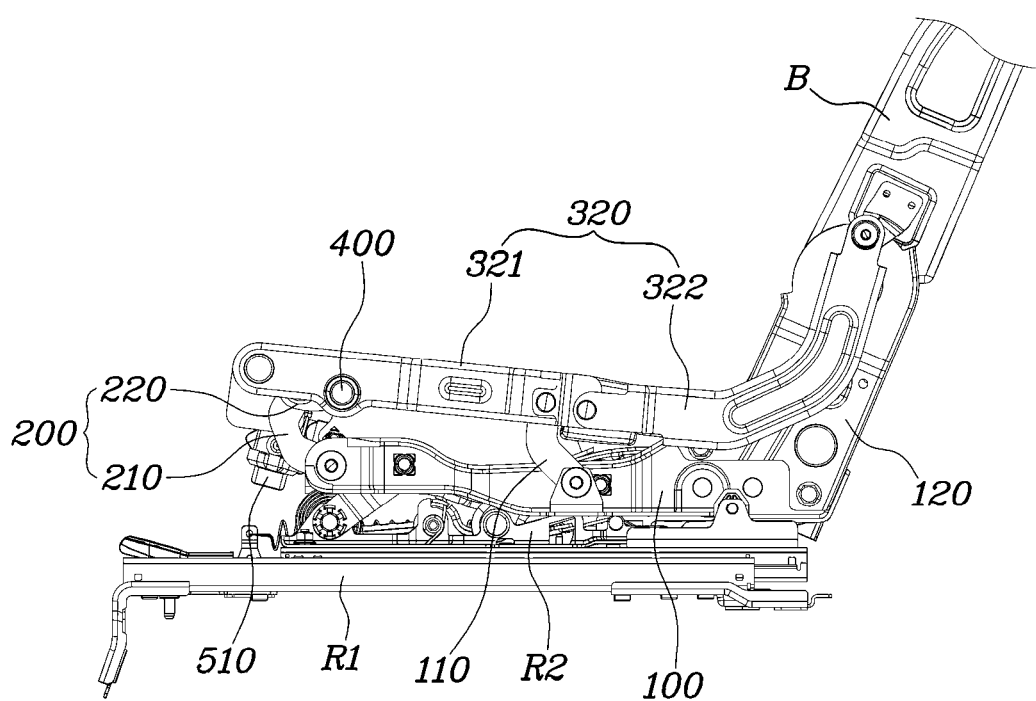
FIG. 2 illustrates an initial state of the seat adjustment apparatus for mobility, shown in FIG. 1.
Figure 3:
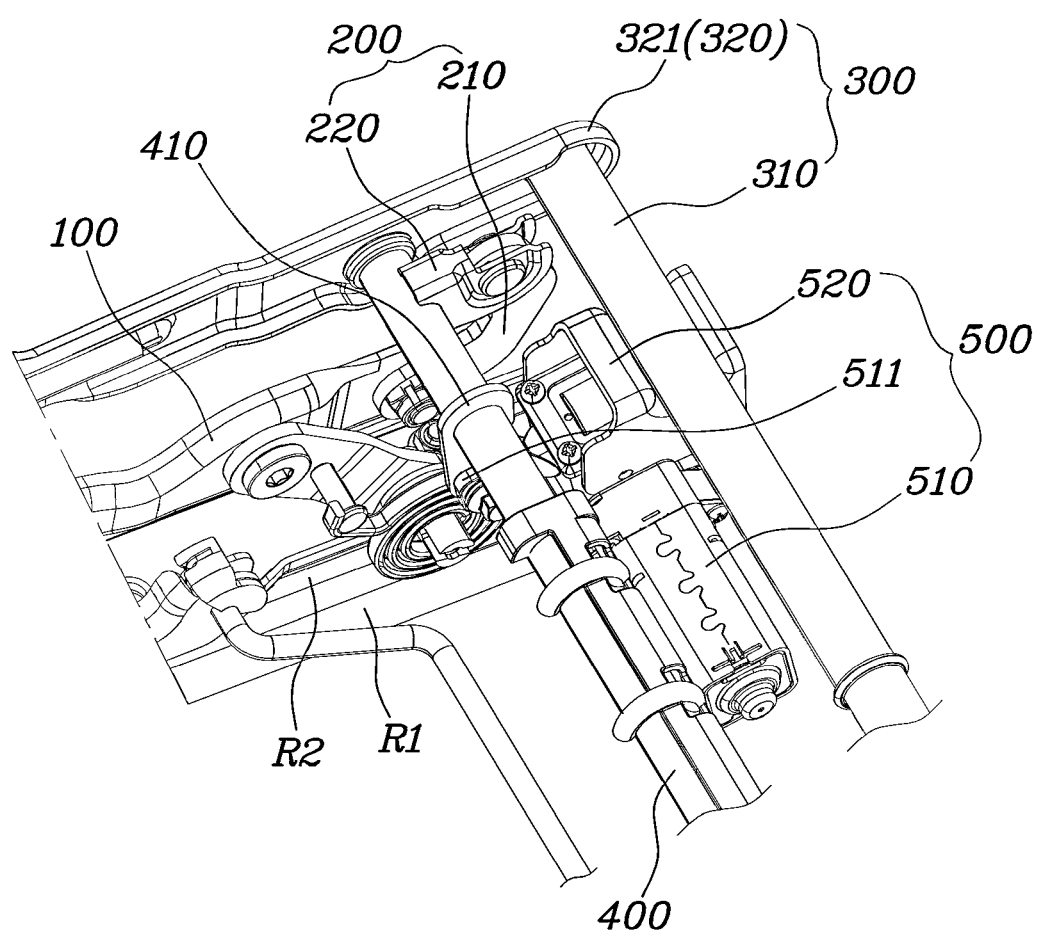
FIG. 3 illustrates a height link, a tilting frame, a tilting bar, and a driving unit in the initial state of a seat adjustment apparatus for mobility according to an exemplary embodiment of the present disclosure.
Figure 4:
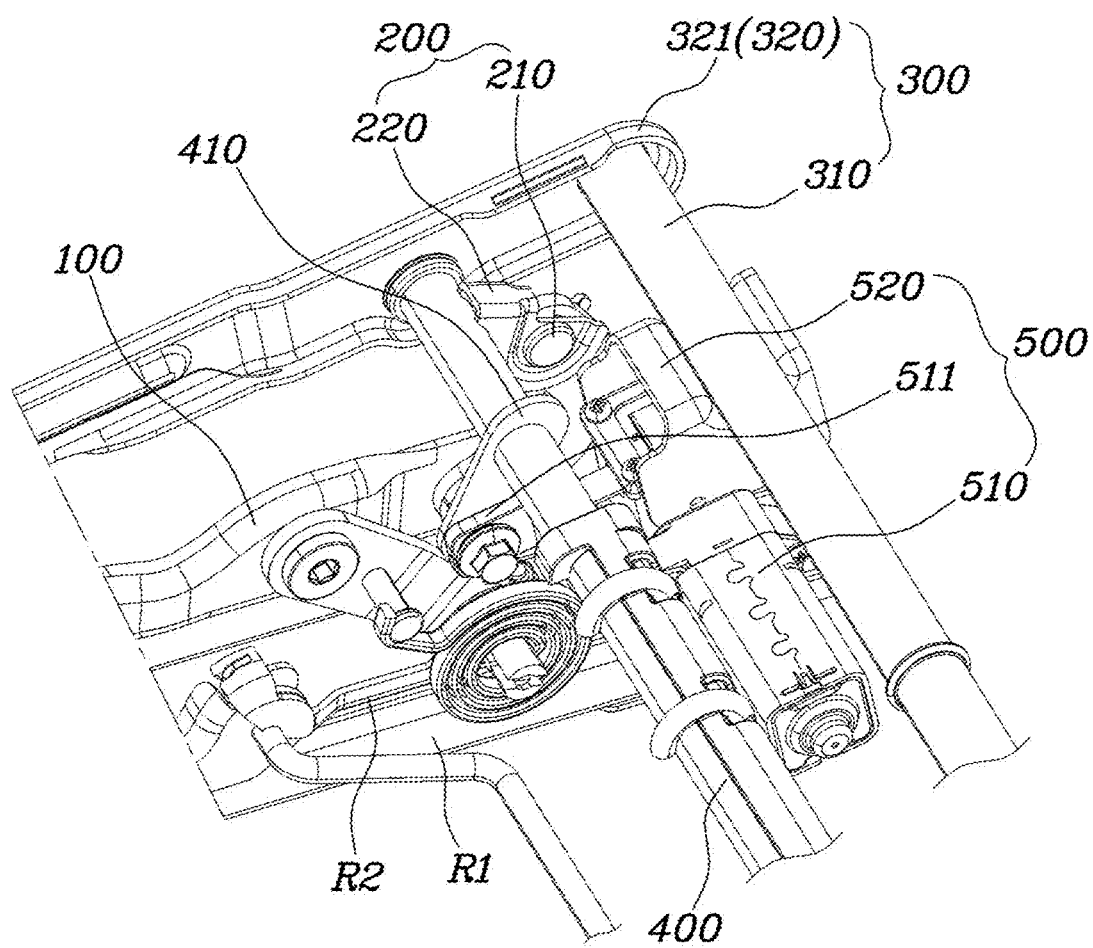
FIG. 4 illustrates a height link, a tilting frame, a tilting bar, and a driving unit, which are interlocked with each other during a tilting operation of a seat adjustment apparatus for mobility according to an exemplary embodiment of the present disclosure.

FIG. 1 illustrates a seat adjustment apparatus for mobility according to an exemplary embodiment of the present disclosure, FIG. 2 illustrates an initial state of the seat adjustment apparatus for mobility, shown in FIG. 1, FIG. 3 illustrates a height link, a tilting frame, a tilting bar, and a driving unit in the initial state of a seat adjustment apparatus for mobility according to an exemplary embodiment of the present disclosure, and FIG. 4 illustrates a height link, a tilting frame, a tilting bar, and a driving unit, which are interlocked with each other during a tilting operation of a seat adjustment apparatus for mobility according to an exemplary embodiment of the present disclosure.

Figure 5:
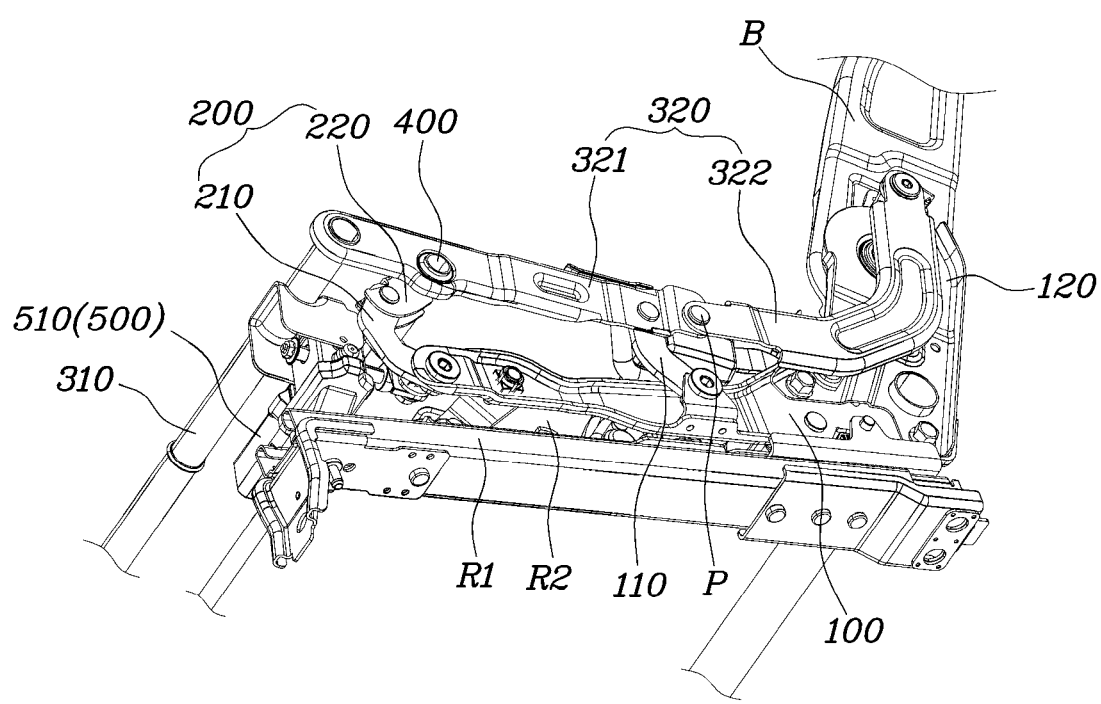
FIG. 5 illustrates the connection of a front hockey bar, a rear hockey bar, a support link of a seat adjustment apparatus for mobility according to another exemplary embodiment of the present disclosure.

FIG. 5 illustrates the connection of a front hockey bar, a rear hockey bar, a support link of a seat adjustment apparatus for mobility according to another exemplary embodiment of the present disclosure.

Figure 6:
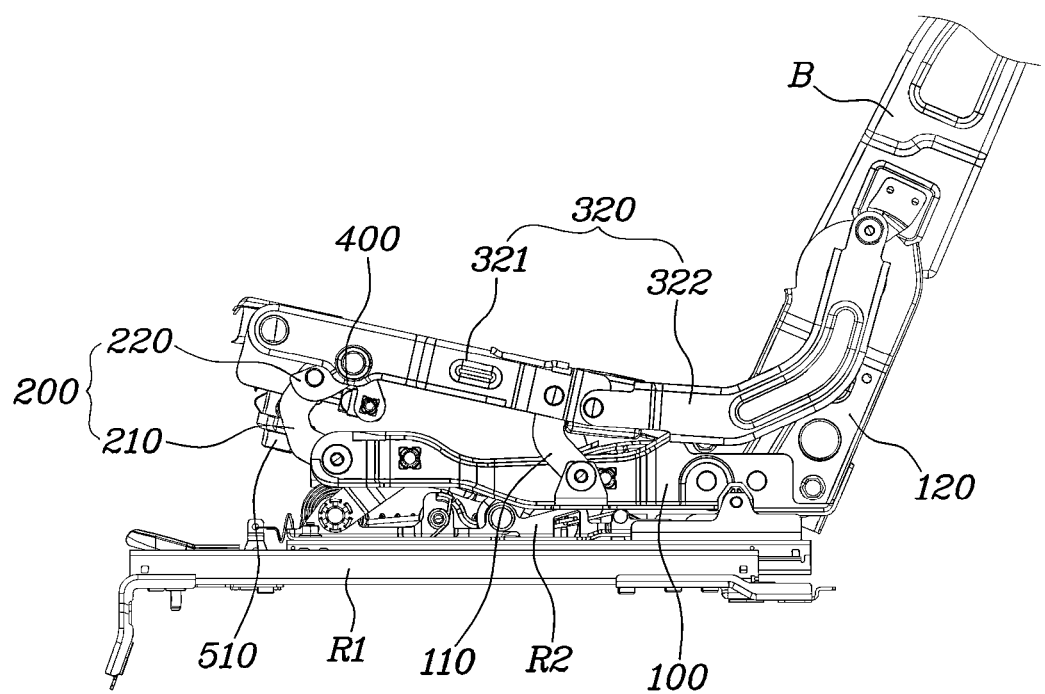
FIG. 6 illustrates a state in which a tilting mode is implemented in the seat adjustment apparatus for mobility, shown in FIG. 1.
Figure 7:
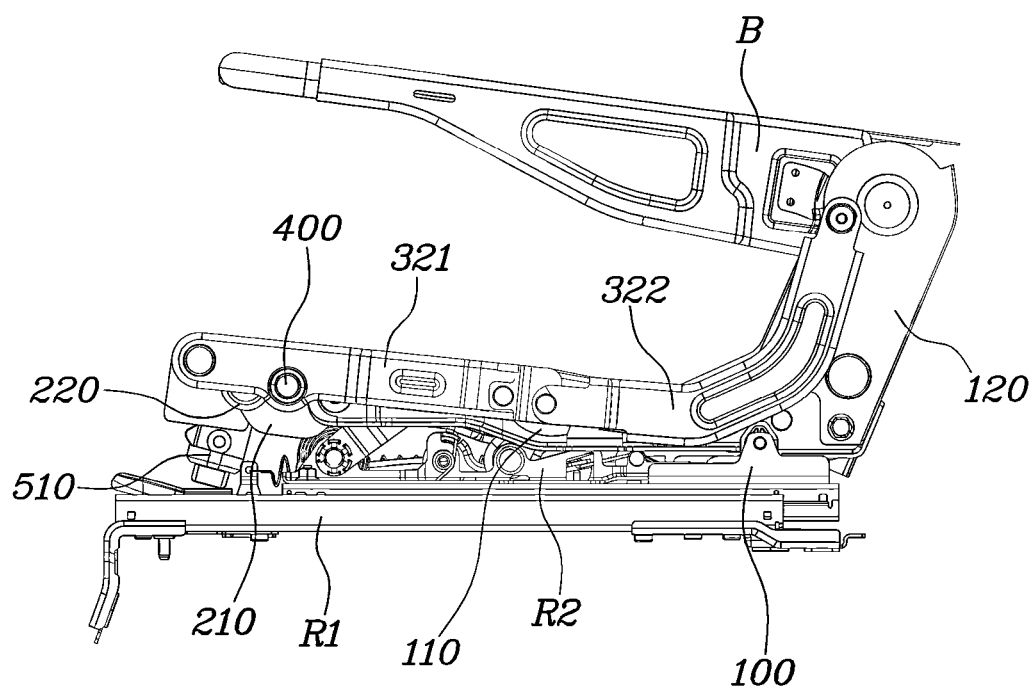
FIG. 7 illustrates a state in which a back frame is folded in the seat adjustment apparatus for mobility, shown in FIG. 1.

FIG. 6 illustrates a state in which a tilting mode is implemented in the seat adjustment apparatus for mobility, shown in FIG. 1, and FIG. 7 illustrates a state in which a back frame is folded in the seat adjustment apparatus for mobility, shown in FIG. 1.

As shown in FIG. 1, FIG. 2, FIG. 3, and FIG. 4, the seat adjustment apparatus for mobility according to an exemplary embodiment of the present disclosure includes: a set bracket 100 to which a back frame B is rotatably connected; a height link 200 including a plurality of links and rotatably connected to the front portion of the set bracket 100; a tilting frame 300 including a front pipe 310 and side members 320, the each of side members 320 including a front end portion connected to the front pipe 310 and a rear end portion rotatably connected to the back frame B; a tilting bar 400 rotatably connected to the front end portion of the side member 320 and extending in the same direction as the front pipe 310, the height link 200 being coupled to the tilting bar; and a driving unit 500 provided at the front pipe 310 and connected to the tilting bar 400 to rotate the tilting bar 400 as the length thereof is changed in the forward and backward directions during an operation thereof, whereby the respective links of the height link 200 connected to the tilting bar 400 are deployed or folded so that the position of the front end portion of the tilting frame 300 is adjusted in the upward and downward directions.

The set bracket 100 may be provided on a moving rail R2 sliding on a fixed rail R1 to be moved together with the moving rail R2 along the fixed rail R1. The set bracket 100 may be provided with a base bracket 120 in consideration of the installation position of the back frame B, and the back frame B may be rotatably provided at the base bracket 120 via a recliner.

The set bracket 100 is provided with the height link 200 configured by the plurality of links and includes the tilting frame 300 provided to be tiltable via the height link 200.

The tilting frame 300 includes the front pipe 310 and the side members 320, the front pipe 310 is provided on the frontmost portion of a seat cushion and extends in the lateral direction, and the pair of side members 320 extend backward from both end portions of the front pipe 310. Accordingly, the tilting frame 300 forms a space in which the occupant's lower body is accommodated.

The tilting bar 400 extending laterally along the front pipe 310 is rotatably connected to each of the side members 320 of the tilting frame 300.

Furthermore, the height link 200 is coupled to the tilting bar 400 so that the respective links of the height link 200 are operated to be unfolded or folded when the tilting bar 400 is rotated.

Here, the driving unit 500 is provided on the front pipe 310 of the tilting frame 300, and the driving unit 500 is connected to the tilting bar 400 so that the tilting bar 400 is rotated according to whether the driving unit 500 is operated.

Accordingly, when the driving unit 500 is operated and the tilting bar 400 is thus rotated, the tilting bar 400 is rotated with respect to the side member 320 so that the respective links of the height link 200 connected to the tilting bar 400 are unfolded. Therefore, the length of the height link 200 is increased upwards. Accordingly, the tilting frame 300 performs a tilting operation as the position of the front end portion thereof to which the tilting bar 400 is connected is adjusted in the upward direction thereof.

According to the detailed description of the present disclosure described above, as shown in FIG. 2, FIG. 3 and FIG. 4, the height link 200 includes a dive link 210 rotatably connected to the set bracket 100, and a tilt link 200 coupled to the tilting bar 400, and the dive link 210 and the tilt link 220 are rotatably connected to each other.

As described above, the height link 200 is configured by the dive link 210 and the tilt link 220, and the dive link 210 and the tilt link 220 are rotatably connected to each other so that the dive link 210 and the tilt link 220 may be operated to be unfolded or folded.

The dive link 210 is rotatably connected to the set bracket 100, and the tilt link 220 is coupled to the tilting bar 400 so that the dive link 210 and the tilt link 220 are provided vertically. The dive link 210 and the tilt link 220 are rotatably connected so that when the dive link 210 and the tilt link 220 are unfolded, the height formed thereby is increased upward or downward and when the dive link 210 and the tilt link 220 are folded, the height formed thereby is decreased.

The dive link 210 may be formed to be curved upward, and the tilt link 220 may be formed to wrap around the dive link 210 to be hinged to the dive link 210 while wrapping around the dive link 210 and may be coupled to the tilting bar 400.

The dive link 210 extends to be bent forward so that the length of the dive link 210 may be secured and the change amount in the vertical height of the height link 200 caused by the rotation of the dive link 210 may be secured. As a result, a tilting angle of the tilting frame 300 is increased.

The tilt link 220 is formed to wrap around the dive link 210 and is hinged to the end portion of the dive link 210 while wrapping around the same, securing the connection between the tilt link 220 and the dive link 210. Furthermore, the tilt link 220 is formed to surround the dive link 210 to have the increased contact area with the tilting bar 400, and thus may be securely fixed to the tilting bar 400.

Meanwhile, as shown in FIG. 1 and FIG. 2, the set bracket 100 further includes a support link 110 rotatably connected to the middle portion thereof, and the support link 110 is rotatably connected to the middle portion of the tilting frame 300.

That is, the support link 110 is rotatably hinged to the middle portions of the set bracket 100 and the tilting frame 300 to support the tilting frame 300 with respect to the set bracket 100 and determine a tilting position.

The support link 110 guides a tilting operation of the tilting frame 300 while rotating along with the tilting frame 300 when the tilting frame 300 is tilted upwards and downwards. Furthermore, the support link 110 supports the tilting frame 300 with respect to the set bracket 100 to support so that the tilted position of the tilting frame 300 is maintained.

The side members 320 of the tilting frame 300 include: a front hockey bar 321 including a front end portion to which the front pipe 310 and the tilting bar 400 are connected and the rear end portion to which the support link 110 is rotatably connected; and a rear hockey bar 322 including a front end portion rotatably connected to the front hockey bar 321 and a rear end portion rotatably connected to the back frame B.

As described above, the side members 320 include the front hockey bar 321 and the rear hockey bar 322, and the front hockey bar 321 and the rear hockey bar 322 are rotatably connected to each other. Thus, the front hockey bar 321 is rotated with respect to the rear hockey bar 322 to enable a tilting operation.

That is, the front pipe 310 is connected to the front end portion of the front hockey bar 321 so that the overall shape of the tilting frame 300 is formed. The tilting bar 400 is rotatably connected to the front end portion of the front hockey bar 321 and thus the tilting bar 400 is freely rotated with respect to the front hockey bar 321 so that when the tilting bar 400 is moved in the upward and downward directions by the height link 200, the front hockey bar 321 moves in the upward and downward directions together.

The front end portion of the rear hockey bar 322 is rotatably connected to the rear end portion of the front hockey bar 321, and the rear end portion of the rear hockey bar 322 is rotatably connected to the back frame B. Here, the front hockey bar 321 may extend linearly in forward/backward directions, and the rear hockey bar 322 may extend to be curved backward thereof.

In the present disclosure, the dive link 210 and the tilt link 220 forming the height link 200 are unfolded according to the rotation of the tilting bar 400 during an operation of the driving unit 500 so that the tilting bar 400 is raised and the front hockey bar 321 connected to the tilting bar 400 to is accordingly raised. At the instant time, the front hockey bar 321 is rotated with respect to the rear hockey bar 322, and the rear hockey bar 322 is rotated backward in association with the rotation of the front hockey bar 321.

Accordingly, during the tilting operation through the tilting frame 300, rather than the entire body of an occupant sitting on the seat cushion is raised, the front portions of his or her legs are only raised and his or her buttocks are lowered, maintaining a comfortable sitting posture.

As shown in FIG. 5, the support link 110 may be rotatably connected to a point at which the front hockey bar 321 and the rear hockey bar 322 are connected to each other, and thus may share a rotation center point P of the front hockey bar 321 and the rear hockey bar 322.

Because the front hockey bar 321, the rear hockey bar 322, and the support link 110 share the rotation center point P, and the front hockey bar 321, the rear hockey bar 322, and the support link 110 may be rotatably connected to one another by a single hinge.

Accordingly, the front hockey bar 321, the rear hockey bar 322, and the support link 110 may be operated in conjunction with one another, based on the rotation center point P. Furthermore, the front hockey bar 321, the rear hockey bar 322, and the support link 110, which are rotatably connected to one another by a single hinge, enable the simplified structure thereof and reduced manufacturing cost.

The driving unit 500 includes: the driving motor 510 provided at the front pipe 310 of the tilting frame 300; and a power transmission unit 520 rotatably connected to the tilting bar 400 and drawn into or out of the driving motor 510 during an operation of the driving motor 510.

As described above, the driving unit 500 includes the driving motor 510 and the power transmission unit 520. The driving motor 510 may be configured as a motor configured for forward and reverse rotation and may be provided at the front pipe 310 via a motor bracket 511.

The power transmission unit 520 may be configured as a load screw that receives rotation force from the driving motor 510 to be drawn out of or drawn into the same. Furthermore, the power transmission unit 520 is rotatably connected to the tilting bar 400, and thus the tilting bar 400 is rotated by a linear motion of the power transmission unit 520.

Accordingly, a moving link 410 is coupled to the tilting bar 400 to be rotated along with the tilting bar 400, and the power transmission unit 520 is rotatably connected to the moving link 410.

That is, the moving link 410 is coupled to the tilting bar 400 and hinged to the power transmission unit 520, so that the same is pushed and rotated by the movement of the power transmission unit 520 when the power transmission unit 520 moves linearly according to an operation of the driving motor 510. Accordingly, the tilting bar 400 integrally combined with the moving link 410 is rotated along with the moving link 410 so that the tilting frame 300 can perform a tilting operation by the rotation of the height link 200.

The moving link 410 may be hinged to the power transmission unit 520, and a portion to which a hinge is coupled may be formed as a long groove to absorb clearance generated by the rotation of the moving link 410 during linear motion of the power transmission unit 520.

Therefore, the tilting bar 400 is rotated along with the moving link 410 as the power transmission unit 520 which is linearly moved during an operation of the driving motor 510 rotates the moving link 410. Due to a direct connection structure formed by the power transmission unit 520 and the moving link 410, the tilting bar 400 is immediately rotated when the driving motor 510 is operated, securing operation performance resulting from the tilting operation of the tilting frame 300.

Furthermore, the driving motor 510 is provided obliquely downwardly from the front pipe 310, and the power transmission unit 520 is drawn into or out of the rear side of the driving motor 510.

As described above, the driving motor 510 is provided at the front pipe 310, and the driving motor 510 is moved upward and downward during the tilting operation of the tilting frame 300, so that a space below the tilting frame 300 is secured.

Furthermore, the driving motor 510 is provided obliquely downwardly from the front pipe 310 and the power transmission unit 520 is drawn into or out of the driving motor 510 diagonally downward, so that the rotation of the tilting bar 400 is smoothly performed by the linear motion of the power transmission unit 520. Furthermore, the tilting bar 400 and the power transmission unit 520 may be provided adjacent to each other by configuring the power transmission unit 520 to be diagonally drawn into or out, facilitating advantageous package.

The seat adjustment apparatus for mobility according to an exemplary embodiment of the present disclosure may be operated as follows.

In the beginning, the tilting frame 300, the support link 110, the height link 200, and the tilting bar 400 are positioned as shown in FIG. 2 and FIG. 3.

As shown in FIGS. 4 and 6, during a tilting operation of the tilting frame 300, the power transmission unit 520 is drawn out to rotate the tilting bar 400 by operation of the driving motor 510 of the driving unit 500, and the tilt link 220 of the height link 200 connected to the tilting bar 400 is rotated to be moved apart from the dive link 210. Accordingly, the dive link 210 and the tilt link 220 forming the height link 200 are rotated to be apart from each other with respect to the tilting frame 300 so that the front hockey bar 321 is raised in the upward direction thereof. At the instant time, the support link 110 is also rotated with respect to the set bracket 100 to support the rotation of the front hockey bar 321, and as the rear hockey bar 322 is rotated and moved backward along with the front hockey bar 321, the front hockey bar 321 of the tilting frame 300 is raised to be inclined upward and the rear hockey bar 322 is lowered.

Therefore, in a tilting mode of the seat cushion, the occupant's buttocks do not rise high and thus the occupant's lower body may be maintained in a stable posture. That is, the occupant's hip point is downwardly moved lower than the occupant's legs are raised.

As shown in FIG. 7, when the back frame B is folded, the rear hockey bar 322 forming the tilting frame 300 is moved forward in association with of the back frame B in the folding direction of thereof and the front hockey bar 321 is also moved forward thereof.

At the present time, the dive link 210 forming the height link 200 is folded onto the tilt link 220 while being rotated, and the support link 110 is also rotated with respect to the set bracket 100 so that the tilting frame 300 is lowered while being moved forward thereof.

Accordingly, when the back frame B is folded, the seat cushion is lowered so that a space above the back frame B is secured.

In the seat adjustment apparatus for mobility, configured as described above, when the seat cushion is tilted, the front portion of the seat cushion is raised and the rear portion of the seat cushion is lowered. Accordingly, the occupant's lower body is not entirely raised to prevent the occupant's feet from excessively rising from the floor. As a result, a separate footrest for supporting the occupant' feet is not required, and convenience is improved by realizing a stable posture of an occupant.

Furthermore, the tilting bar 400 provided for tilting the seat cushion supports the seat frame, and accordingly, the lower body posture of the occupant is prevented from collapsing due to deformation of the seat cushion when a collision occurs, securing the occupant's stability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A seat adjustment apparatus for mobility, the seat adjustment apparatus comprising:
   a set bracket to which a back frame is rotatably connected;
   a height link including a plurality of links and rotatably connected to a front portion of the set bracket;
   a tilting frame including a front pipe and a side member, the side member including a front end portion connected to the front pipe and a rear end portion rotatably connected to the back frame;

a tilting bar rotatably connected to a front end portion of the side member and extending in an identical direction to the front pipe, the height link being coupled to the tilting bar; and a driving unit provided at the front pipe and connected to the tilting bar to rotate the tilting bar as a length thereof is changed in forward and backward directions during an operation thereof.

2. The seat adjustment apparatus of claim 1, wherein the respective links of the height link connected to the tilting bar are unfolded or folded according to the rotation of the tilting bar during the operation of the driving unit so that a position of a front end portion of the tilting frame is adjusted in upward and downward directions.

3. The seat adjustment apparatus of claim 1,
wherein the links of the height link include:
a dive link rotatably connected to the set bracket; and
a tilt link coupled to the tilting bar, and
wherein the dive link and tilt link are rotatably connected to each other.

4. The seat adjustment apparatus of claim 3, wherein the dive link is formed to be curved upward.

5. The seat adjustment apparatus of claim 4, wherein the tilt link is formed to wrap around the dive link to be hinged to the dive link while wrapping around the dive link and is coupled to the tilting bar.

6. The seat adjustment apparatus of claim 1, wherein the side member of the tilting frame includes:
a front hockey bar including a front end portion to which the front pipe and the tilting bar are connected; and
a rear hockey bar including a front end portion rotatably connected to a rear end portion of the front hockey bar and a rear end portion rotatably connected to the back frame.

7. The seat adjustment apparatus of claim 6, further including a support link rotatably connected to a middle portion of the set bracket, wherein the support link is rotatably connected to the front hockey bar or the rear hockey bar.

8. The seat adjustment apparatus of claim 6, further including a support link rotatably connected to a middle portion of the set bracket, wherein the support link is rotatably connected to a point at which the front hockey bar and the rear hockey bar are pivotally connected to each other, for sharing a rotation center point of the front hockey bar and the rear hockey bar.

9. The seat adjustment apparatus of claim 1, wherein the driving unit includes a driving motor provided at the front pipe of the tilting frame, and a power transmission unit rotatably connected to the tilting bar and configured to be drawn into or out of the driving motor during an operation of the driving motor.

10. The seat adjustment apparatus of claim 9, wherein a moving link is fixed to the tilting bar and is rotated along with the tilting bar, and the power transmission unit is rotatably connected to the moving link.

11. The seat adjustment apparatus of claim 9, wherein the driving motor is provided obliquely downwardly from the front pipe, and the power transmission unit is drawn out of or into a rear side of the driving motor.

12. A seat adjustment apparatus for mobility, the seat adjustment apparatus comprising:
a set bracket to which a back frame is rotatably connected;
a height link including:
a dive link, a first end portion of which is rotatably connected to the set bracket; and
a tilt link, a first end portion of which is coupled to the tilting bar, wherein second end portions of the dive link and tilt link are rotatably connected to each other,
a tilting frame including a front pipe and a side member, wherein the side member includes a front end portion connected to the front pipe and a rear end portion rotatably connected to the back frame;
a tilting bar rotatably connected to a front end portion of the side member, wherein a second end portion of the tile link in the height link is coupled to the tilting bar; and
a driving unit provided at the front pipe and connected to the tilting bar to rotate the tilting bar as a length thereof is changed in forward and backward directions during an operation thereof so that a position of a front end portion of the tilting frame is adjusted in upward and downward directions.

13. The seat adjustment apparatus of claim 12, wherein the dive link is formed to be curved upward.

14. The seat adjustment apparatus of claim 13, wherein the tilt link is formed to wrap around the dive link to be hinged to the dive link while wrapping around the dive link and is coupled to the tilting bar.

15. The seat adjustment apparatus of claim 12, wherein the side member of the tilting frame includes:
a front hockey bar including a front end portion to which the front pipe and the tilting bar are connected; and
a rear hockey bar including a front end portion rotatably connected to a rear end portion of the front hockey bar and a rear end portion rotatably connected to the back frame.

16. The seat adjustment apparatus of claim 15, further including a support link rotatably connected to a middle portion of the set bracket, wherein the support link is rotatably connected to the front hockey bar or the rear hockey bar.

17. The seat adjustment apparatus of claim 15, further including a support link rotatably connected to a middle portion of the set bracket, wherein the support link is rotatably connected to a point at which the front hockey bar and the rear hockey bar are pivotally connected to each other, for sharing a rotation center point of the front hockey bar and the rear hockey bar.

18. The seat adjustment apparatus of claim 12, wherein the driving unit includes a driving motor provided at the front pipe of the tilting frame, and a power transmission unit rotatably connected to the tilting bar and configured to be drawn into or out of the driving motor during an operation of the driving motor.

19. The seat adjustment apparatus of claim 18, wherein a moving link is fixed to the tilting bar and is rotated along with the tilting bar, and the power transmission unit is rotatably connected to the moving link.

\* \* \* \* \*